United States Patent
Ogawa et al.

(10) Patent No.: US 11,687,599 B2
(45) Date of Patent: Jun. 27, 2023

(54) DATA RETRIEVING APPARATUS, METHOD, AND PROGRAM

(71) Applicant: NIPPON TELEGRAPH AND TELEPHONE CORPORATION, Tokyo (JP)

(72) Inventors: Manami Ogawa, Musashino (JP); Masataka Sato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 138 days.

(21) Appl. No.: 17/426,748

(22) PCT Filed: Jan. 30, 2020

(86) PCT No.: PCT/JP2020/003465
§ 371 (c)(1),
(2) Date: Jul. 29, 2021

(87) PCT Pub. No.: WO2020/158871
PCT Pub. Date: Aug. 6, 2020

(65) Prior Publication Data
US 2022/0100804 A1   Mar. 31, 2022

(30) Foreign Application Priority Data
Jan. 31, 2019   (JP) .................................. 2019-015479

(51) Int. Cl.
*G06F 16/00*   (2019.01)
*G06F 16/93*   (2019.01)
(Continued)

(52) U.S. Cl.
CPC ............ *G06F 16/93* (2019.01); *G06F 16/907* (2019.01); *G06F 16/9035* (2019.01); *G06F 16/9038* (2019.01)

(58) Field of Classification Search
CPC ....................................................... G06F 16/93
See application file for complete search history.

(56) References Cited

U.S. PATENT DOCUMENTS

| 2017/0024657 | A1 | 1/2017 | Sahu et al. |
| 2018/0081763 | A1* | 3/2018 | Christie ............... G06F 16/254 |

FOREIGN PATENT DOCUMENTS

| JP | 2008287394 A | 11/2008 |
| JP | 201165384 A | 3/2011 |
| JP | 2014232510 A | 12/2014 |

OTHER PUBLICATIONS

Hiroshi Nakagawa et al., Term Extraction Based on Occurrence and Concatenation Frequency, Natural language processing, vol. 10, No. 1, 2003, pp. 27-45.
(Continued)

*Primary Examiner* — Ajith Jacob
(74) *Attorney, Agent, or Firm* — Harness, Dickey & Pierce, P.L.C.

(57) ABSTRACT

A data search apparatus according to an embodiment includes: an input unit; and a storage apparatus configured to store master data names managed with master data. The data search apparatus calculates edit distances between master data names stored in the storage apparatus and input data names input in the input unit, calculates degrees of similarity between the master data names and the input data names based on term frequency and inverse document frequency of the master data names and the input data names, performs processing for narrowing down candidates for the data name being searched for in the master data names based on the calculation results and adjacency information indicating adjacency relationships between the master data names and the input data names, and outputs information indicating correspondence between the master data names and the input data names based on the candidate for the data name
(Continued)

being searched for, the candidate for the data name being obtained through the narrowing-down processing.

5 Claims, 7 Drawing Sheets

(51) Int. Cl.
    *G06F 16/907*    (2019.01)
    *G06F 16/9038*   (2019.01)
    *G06F 16/9035*   (2019.01)

(56) References Cited

OTHER PUBLICATIONS

Yuichiro Sekiguchi et al., Clipped Word Extraction using Blog Documents, Database Society of Japan Letters (DBSJ Letters), vol. 6, No. 2, 2007.
Kenichi Nishikawa et al., Application of a user interface augmentation method to Web-based OSS, IEICE Technical Report, vol. 116, No. 507, 2017, pp. 81-85.

* cited by examiner

DATA RETRIEVING APPARATUS, METHOD, AND PROGRAM

CROSS-REFERENCE TO RELATED APPLICATIONS

This application is a 371 U.S. National Phase of International Application No. PCT/JP2020/003465 filed on Jan. 30, 2020, which claims priority to Japanese Application No. 2019-015479 filed on Jan. 31, 2019. The entire disclosures of the above applications are incorporated herein by reference.

TECHNICAL FIELD

An embodiment of the present invention relates to a data search apparatus, a method, and a program.

BACKGROUND ART

In a business operation in which data stored in a DB (database) is used, a name of data registered in master data is searched for, and relevant information from the search results is used and referenced in some cases.

However, if there is a difference in the data name registered in the master data and the notation of the actually-input data name due to various reasons such as human error and system actions, so-called notation inconsistencies sometimes occur. If a notation inconsistency occurs, an erroneous result, such as the relevant data name not existing, is displayed in some cases when a search is performed based on the data name as described above.

Examples of techniques for dealing with this kind of notation inconsistency include a method in which inconsistencies in notation are registered in a dictionary in advance for each term (e.g., see PTL 1 or 2), or a method in which candidates for notation inconsistencies are created from combinations of character strings that are divided as appropriate (e.g., see PTL 3).

There are also a method in which a result of approximating a meaning level is presented for a word input by a user for a search by causing a machine to learn an existing database and sentence data (e.g., see NPL 1 or 2), and a method in which input notation inconsistency is prevented due to a pull-down menu being adopted in a data input means through UI (user interface) augmentation (e.g., see NPL 3).

CITATION LIST

Patent Literature

[PTL 1] JP 2011-065384A
[PTL 2] JP 2008-287394A
[PTL 3] JP 2014-232510A

Non-Patent Literature

[NPL 1] HIROSHI NAKAGAWA, HIROAKI YUMOTO, TATSUNORI MORI, "Term Extraction Based on Occurrence and Concatenation Frequency", Natural Language Processing, Vol. 10, No. 1, pp. 27-45, 2003.
[NPL 2] Yuichiro SEKIGUCHI, Yoshihide SATO, Harumi KAWASHIMA, Hidenori OKUDA, "Clipped Word Extraction using Blog Documents", DBSJ Letters, Vol. 6, No. 2, pp. 21-24, 2007.
[NPL 3] Kenichi NISHIKAWA, Takeshi MASUDA, Hiroyuki ADACHI, Akira INOUE, "Application of a user interface augmentation method to Web-based OSS", IEICE Technical Report, Vol. 116, No. 507, pp. 81-85, 2017.

SUMMARY OF THE INVENTION

Technical Problem

Examples of inconsistencies in notation of data names include i) notation in which a registered data name is abbreviated, and ii) notation based on a nickname or a so-called alias obtained based on local rules to be used by users. In this case, the methods disclosed in PTL 1 to PTL 3 above are effective on notation resulting from abbreviation.

However, the methods disclosed above are not effective for aliases. This is because the method disclosed in PTL 3 infers an abbreviated notation based on the characters constituting the original name, but unlike a notation obtained by simply abbreviating a name, an alias is often a title that is quite different from the original name, and therefore it is difficult to link the original data name.

Also, in a known method in which notation inconsistencies are registered in a dictionary in advance, such as the methods disclosed in PTL 1 and 2, it is essential that personnel who know the local rule register the alias in a dictionary. In this method, in addition to it being difficult to determine whether or not all of the local rules have been included in the dictionary, there is a disadvantage in that unregistered aliases cannot be handled.

There is also a technique of prohibiting input of alias notation through UI augmentation, such as a selection scheme using a pull-down menu, and for example, the method disclosed in NPL 3. However, this method can prevent notation inconsistency from a location at which the technique is adopted, and is not an effective means for a DB in which abbreviation and alias notation are both already present.

In any case, in a business operation in which searching and inquiry using data names are performed as described above, if alias notations are also present, the registered data name corresponding to an alias may not be discovered. In view of this, there is no choice but to adopt a method of asking a person who knows the local rules or searching for likely data names oneself.

Furthermore, if an alias is known, a task of correcting that alias to the data name registered in the master data is needed. These tasks require time and labor, hinder business operations that were originally to be performed, and reduce business efficiency.

The present invention was made with attention given to the foregoing circumstances, and aims to provide a data search apparatus, method, and program that enables searching of a suitable master data name corresponding to an input data name.

Means for Solving the Problem

In order to achieve the above-described object, in a first aspect of a data search apparatus according to an embodiment of the present invention, the data search apparatus includes: an input unit; a storage apparatus configured to store master data names to be managed in association with master data; a first calculation processing unit configured to calculate edit distances between the master data names stored in the storage apparatus and input data names input in the input unit; a second calculation unit configured to calculate degrees of similarity between the master data names and the input data names based on term frequency and inverse document frequency of the master data names and the input data names; and an output unit configured to perform processing for narrowing down candidates for a data name being searched for in the master data names based on the calculation results obtained by the first and second calculation processing units, and adjacency information indicating adjacency relationships between the master data names and the input data names, the output unit being configured to output information indicating correspondence between the master data names and the input data names based on a candidate for the data name being searched for, the candidate being obtained through the narrowing-down processing.

A second aspect of the data search apparatus of the present invention is the first aspect, in which in the narrowing-down processing, the output unit performs processing for selecting, among the master data names stored in the storage apparatus, the master data name with the smallest edit distance calculated by the first calculation processing unit from the input data name as a candidate for a master data name being searched for, and creating a first list indicating a set composed of the selected master data name and the input data name associated with the selection of the master data name; creating a second list indicating, among the input data names in the first list, an input data name associated with a plurality of candidates, and an input data name associated with a master data name that does not have the same notation thereas, creating a third list, which is a list indicating a set composed of one master data name and one input data name of the first list, and creating a fourth list, which is a list indicating a set composed of a plurality or master data names and one input data name in the first list.

In this aspect, in the narrowing-down processing, the output portion performs processing for, for each input data name in the second list, extracting an input data name having an adjacency relationship with the input data name from adjacency information indicating adjacency relationships between a plurality of the input data names, extracting a first master data name, which is a master data name having a correspondence relationship with the extracted input data name, from the master data names in the third list, for each input data name in the second list, extracting a second master data name, which is the extracted first master data name that is associated with an input data name that has the same notation thereas in the third list, from adjacency information indicating adjacency relationships between a plurality of the master data names stored in the storage apparatus, and for each input data name in the second list, extracting a third master data name, which is the extracted first master data name that is associated with an input data name that does not have the same notation thereas in the third list, from the adjacency information indicating adjacency relationships between a plurality of the master data names stored in the storage apparatus.

In this aspect, in the narrowing-down processing, the output portion performs processing for, for each input data name in the second list, creating a data name obtained according to a common set of the extracted second and third master data names as a candidate for the master data name corresponding to the input data name indicated by the second list, and updating the second, third, and fourth lists according to the creation of the candidate for the master data name.

In this aspect, the first calculation processing unit performs processing for calculating, for each input data name in the second list, an edit distance between the input data name and the extracted candidate for the master data name, and in the narrowing-down processing, when the relationship between the calculated edit distance and the number of characters of the candidate for the master data satisfies a condition, the output unit performs processing for deleting a candidate that has no character in common with the input data name among the candidates for the master data name, and adding the deleted master data name and the input data used in the calculation of the edit distance for the deleted master data name to the third list.

A third aspect of the data search apparatus of the present invention is the first aspect, in which, in the narrowing-down processing, the output unit performs processing for selecting, among the master data names stored in the storage apparatus, a master data name with the greatest degree of similarity calculated by the second calculation processing unit to the input data name as a candidate for a master data name being searched for, and creating a first list indicating a set composed of the selected master data name and the input data name associated with the selection of the master data name, creating a second list indicating, among the input data names in the first list, an input data name associated with a plurality of candidates and an input data name associated with a master data name that does not have the same notation thereas, creating a third list, which is a list indicating a set composed of one master data name and one input data name of the first list, and creating a fourth list, which is a list indicating a set composed of a plurality of master data names and one input data name in the first list.

In this aspect, in the narrowing-down processing, the output portion performs processing for, for each input data name in the second list, extracting an input data name having an adjacency relationship with the input data name from adjacency information indicating adjacency relationships between a plurality of the input data names, extracting a first master data name, which is a master data name having a correspondence relationship with the extracted input data name, from the master data names in the third list, for each input data name in the second list, extracting a second master data name, which is the extracted first master data name that is associated with an input data name that has the same notation thereas in the third list, from adjacency information indicating adjacency relationships between a plurality of the master data names stored in the storage apparatus, and for each input data name in the second list, extracting a third master data name, which is the extracted first master data name that is associated with an input data name that does not have the same notation thereas in the third list, from the adjacency information indicating an adjacency relationship between a plurality of the master data names stored in the storage apparatus.

In this aspect, in the narrowing-down processing, the output portion performs processing for, for each input data name in the second list, creating a data name obtained according to a common set of the extracted second and third master data names as a candidate for the master data name corresponding to the input data name indicated by the second list, and updating the second, third, and fourth lists according to the creation of the candidate for the master data name.

In this aspect, the first calculation processing unit performs processing for calculating, for each input data name in the second list, an edit distance between the input data name and the extracted candidate for the master data name, and in the narrowing-down processing, when the relationship between the calculated edit distance and the number of characters of the candidate for the master data satisfies a condition, the output unit performs processing for deleting a candidate that has no character in common with the input data name among the candidates for the master data name, and adding the deleted master data name and the input data used in the calculation of the edit distance for the deleted master data name to the third list.

One aspect of a data search method according to one embodiment of the present invention is a data search method performed by a data search apparatus including an input unit and a storage apparatus storing master data names to be managed in association with master data, the data search method including: calculating edit distances between the master data names stored in the storage apparatus and input data names input using the input unit; calculating degrees of similarity between the master data names and the input data names based on term frequency and inverse document frequency of the master data names and the input data names; performing processing for narrowing down candidates for a data name being searched for in the master data names based on the results of calculating the edit distances and the degrees of similarity, and adjacency information indicating adjacency relationships between the master data names and the input data names; and outputting information indicating correspondence between the master data names and the input data names based on a candidate for a data name being searched for, the candidate being obtained through the narrowing-down processing.

One aspect of a data search processing program according to one embodiment of the present invention causes a processor to function as the units of the data search apparatus according to any one of the first to third aspects.

Effects of the Invention

According to the first aspect of the data search apparatus according to an embodiment of the present invention, processing for narrowing down candidates for a data name being searched for in master data names is performed based on the edit distances between the master data names and the input data names, the degrees of similarity between the master data names and the input data names, and adjacency information indicating the adjacency relationships between the master data names and the input data names. Accordingly, for example, an accurate master data name with respect to an input data name with a large separation from the master data can be specified.

According to the second and third aspects of the data search apparatus according to an embodiment of the present invention, a list indicating input data names associated with multiple candidates for search targets and input data names associated with master data names that do not have the same notation thereas is created, and processing for narrowing down the candidates for the data name being searched for in the master data names is performed using this list and the adjacency information. Accordingly, even if, for example, an alias is the input data name, an accurate master data name for the input data name can be specified.

That is, according to the aspects of the present invention, it is possible to search for a suitable master data name corresponding to an input data name.

DESCRIPTION OF EMBODIMENTS

Hereinafter, an embodiment according to the present invention will be described with reference to the drawings.

The data search apparatus according to an embodiment of the present invention calculates a representative Levenshtein distance as the edit distance between the master data name and the input data name, and calculates the degree of similarity of the data name using TF (Term Frequency)-IDF (Inverse Document Frequency).

The data search apparatus uses logical or physical adjacency information of each piece of data in addition to these calculation results. TF-IDF is used so that, for example, the importance of words included in a document is evaluated.

First, the data search apparatus uses an existing calculation result to search for a data name in the master data. Regarding names of data for which the data name was not specified, the data search apparatus narrows down the candidates for the data name being searched for from the master data using adjacency information showing an adjacency relationship between multiple data names.

The data search apparatus according to an embodiment of the present invention can provide an appropriate candidate for a data name based on master data by using data in an adjacency relationship, even in the case of notation using a so-called alias, which is a nickname obtained based on local rules used by users. This eliminates the need for the time and work that were needed for a user who does not know the local rules to check and correct the alias.

Figure 1:
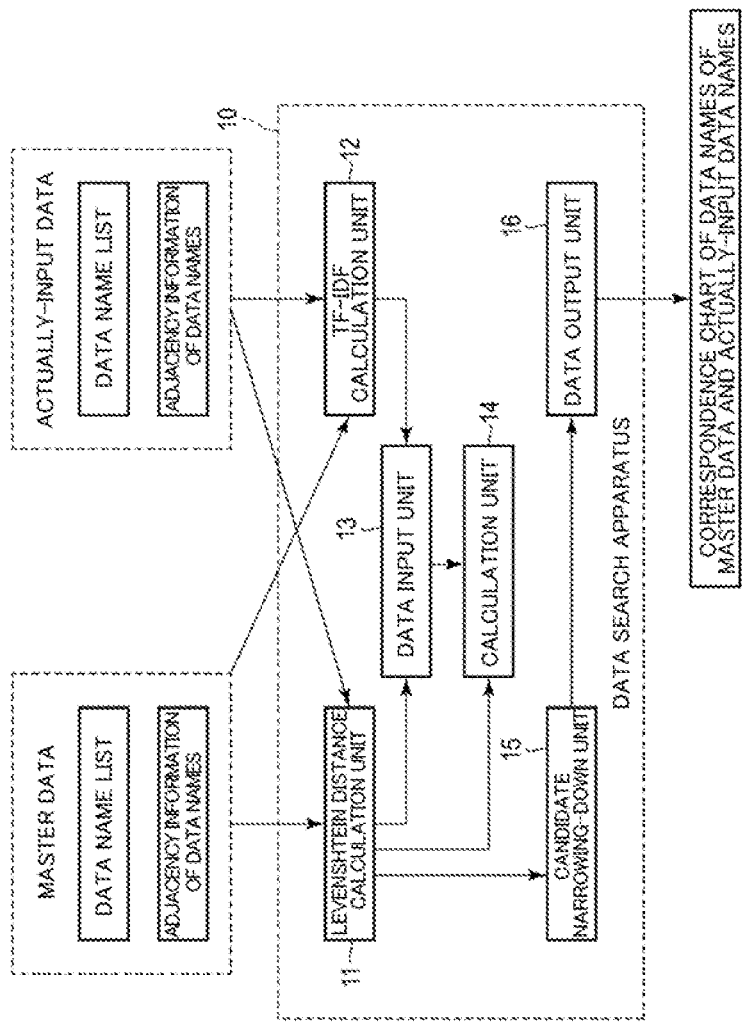
FIG. 1 is a diagram showing an applied example of a data search apparatus according to an embodiment of the present invention.
Figure 2:
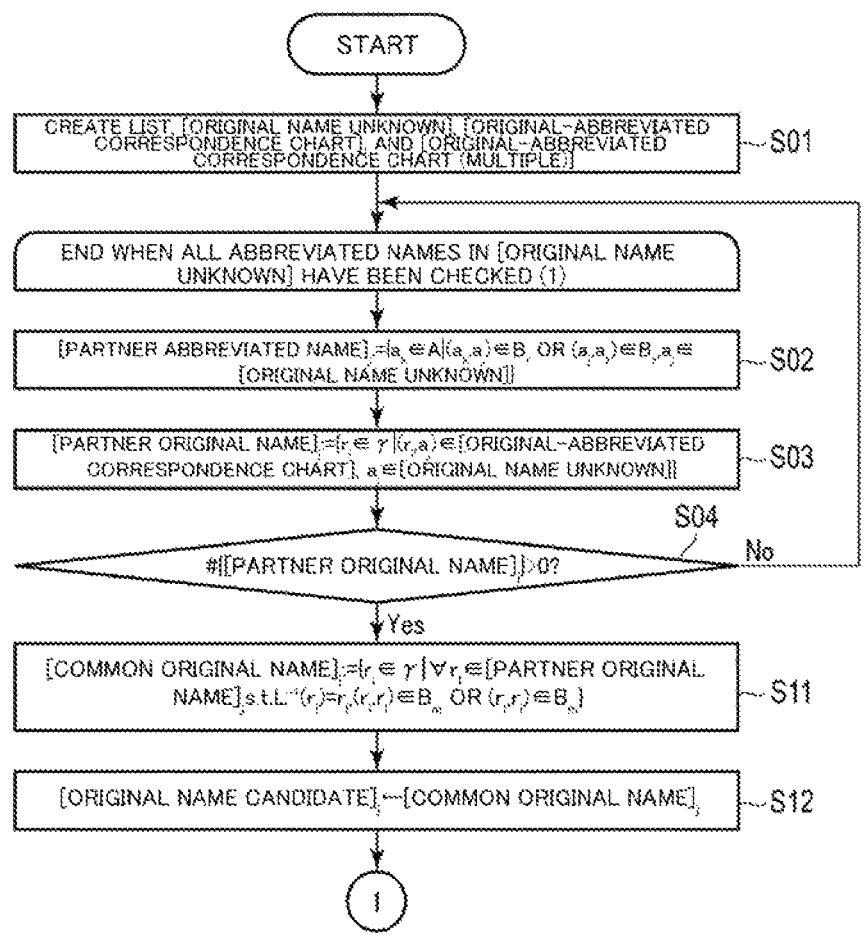
FIG. 2 is a flow chart showing an example of a processing procedure performed by the data search apparatus according to an embodiment of the present invention.
Figure 3:
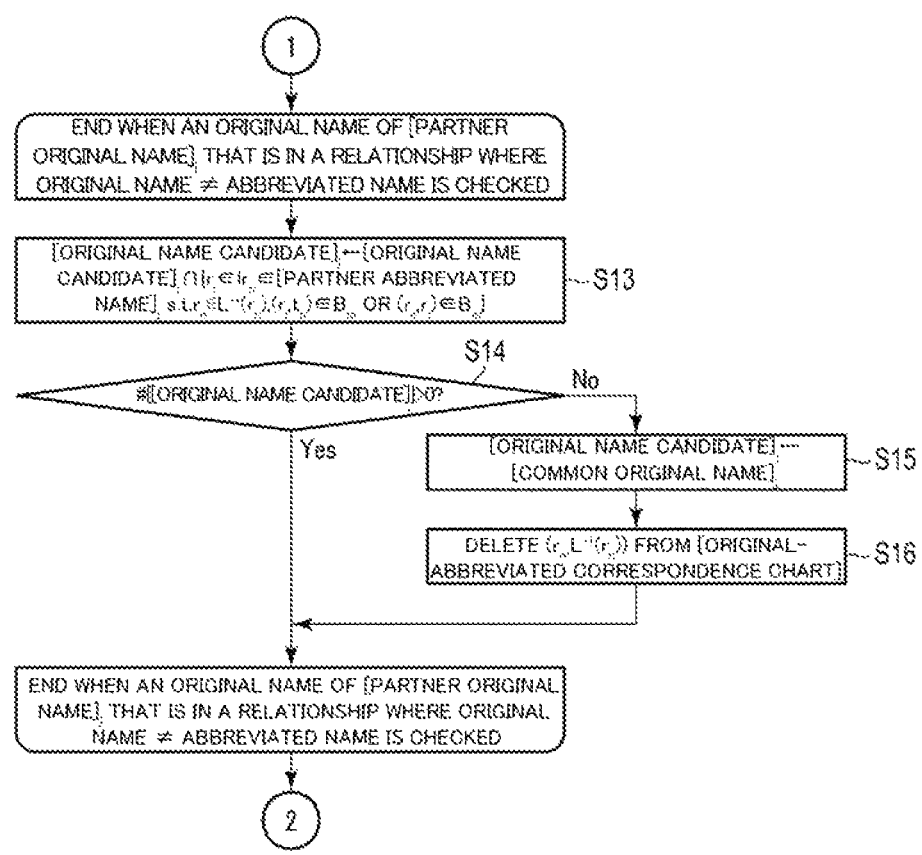
FIG. 3 is a flow chart showing an example of a processing procedure performed by the data search apparatus according to an embodiment of the present invention.
Figure 4:
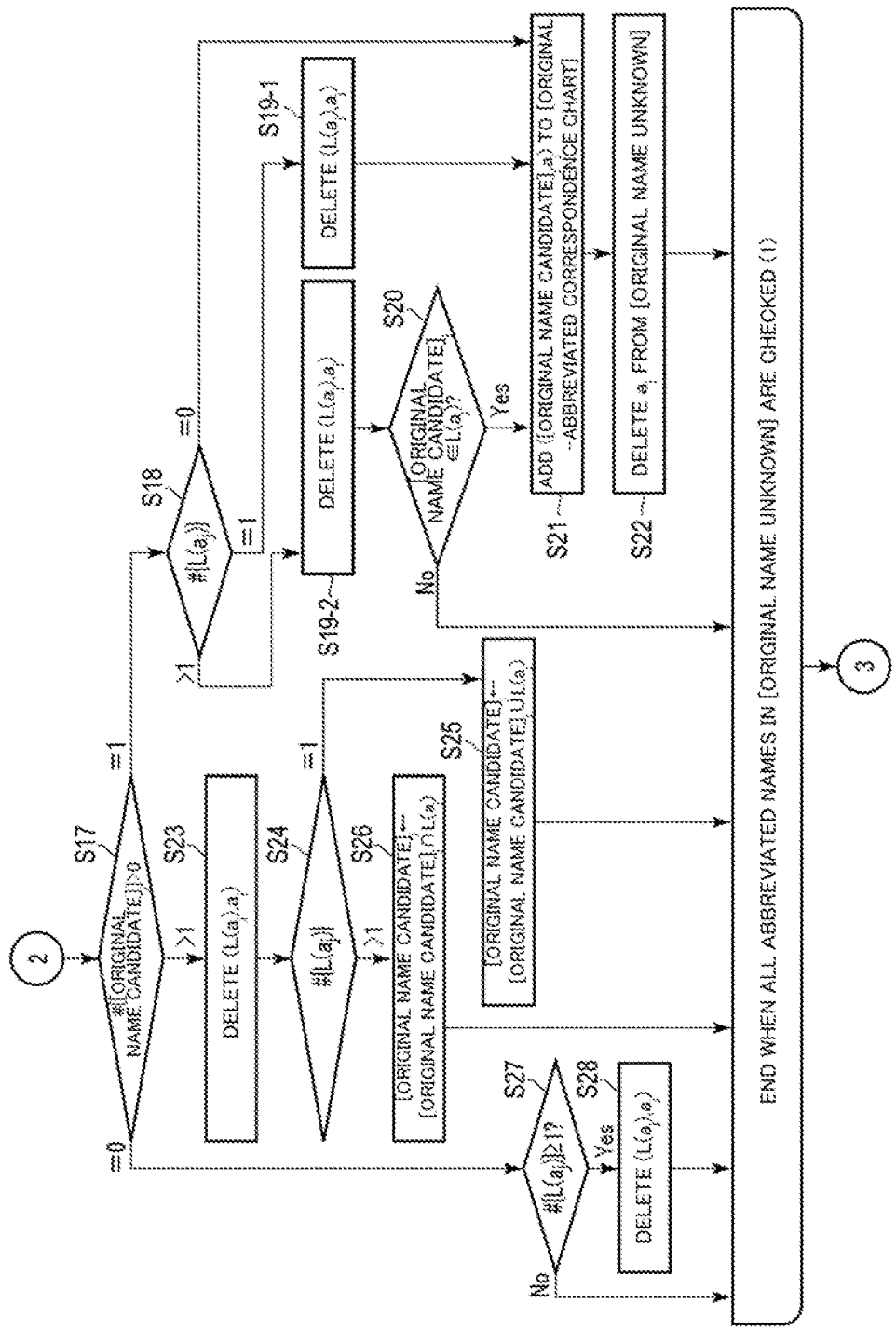
FIG. 4 is a flow chart showing an example of a processing procedure performed by the data search apparatus according to an embodiment of the present invention.
Figure 5:
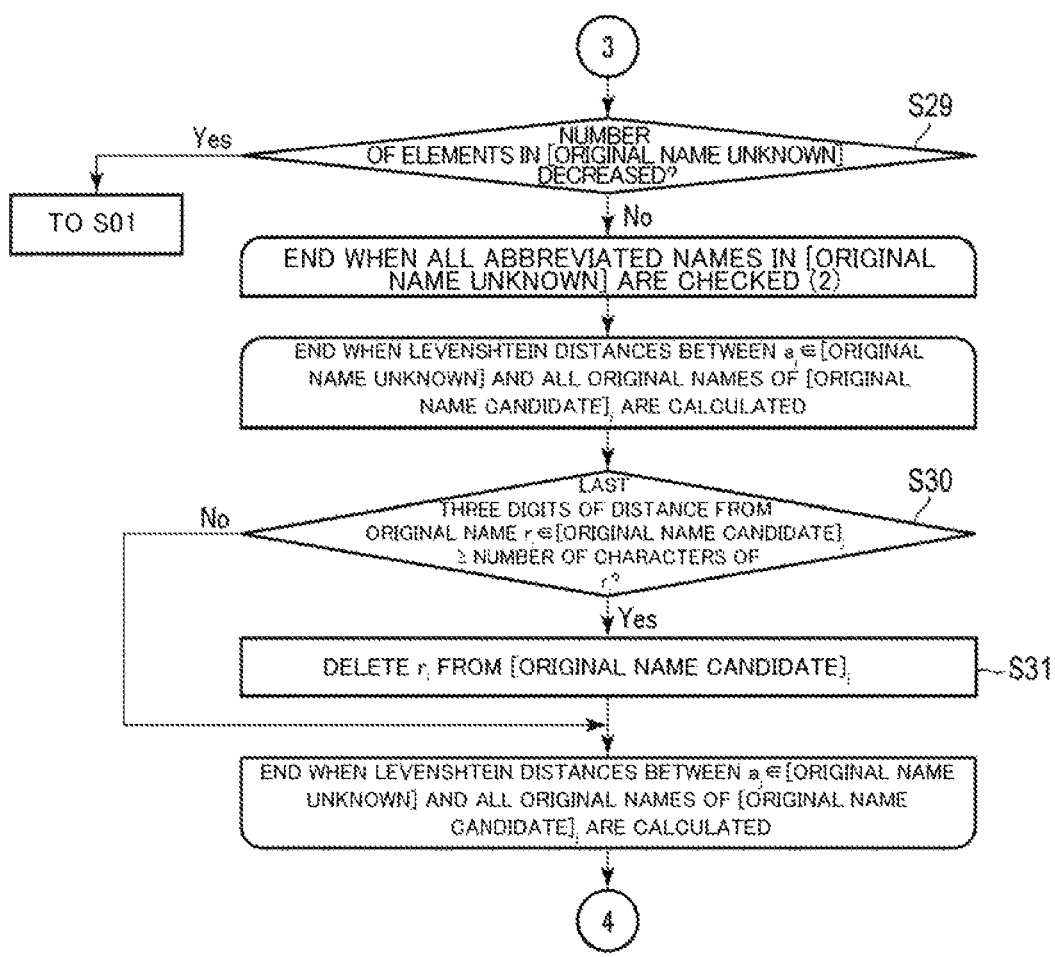
FIG. 5 is a flow chart showing an example of a processing procedure performed by the data search apparatus according to an embodiment of the present invention.
Figure 6:
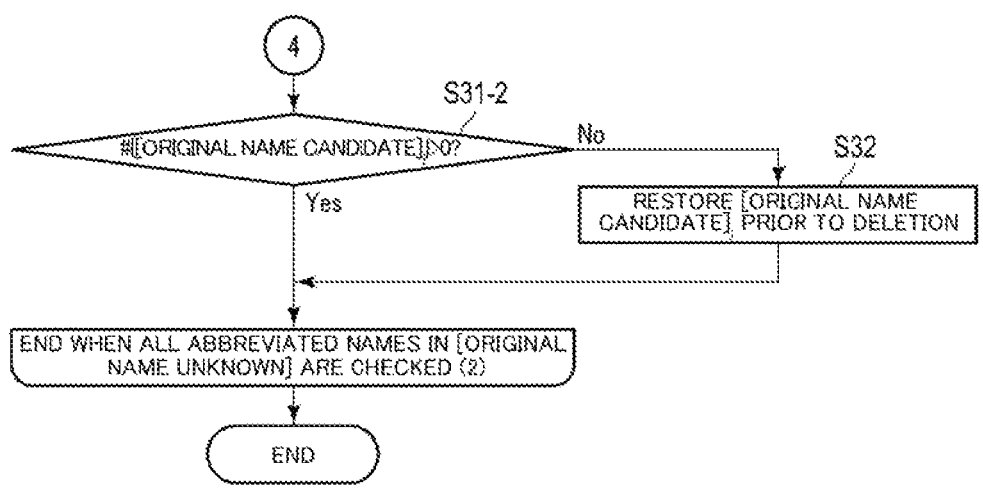
FIG. 6 as a flow chart showing an example of a processing procedure performed by the data search apparatus according to an embodiment of the present invention.

FIG. 1 is a diagram showing an application example of the data search apparatus according to an embodiment of the present invention.

As shown in FIG. 1, the data search apparatus 10 according to an embodiment of the present invention includes a Levenshtein distance calculation unit 11, a TF-IDF calculation unit 12, a data input unit 13, a calculation unit 14, a narrowing-down unit 15, and a data output unit 16. The function of the data search apparatus 10 shown in FIG. 1 is realized by using a processor such as a CPU (Central Processing Unit) that executes a program, an input apparatus such as a keyboard, an output apparatus such as a display, and a storage apparatus such as RAM (Random Access Memory) and a ROM (Read Only Memory). Operations of the units will be described later.

Connection information between a building name and a building can be used as a specific example of data to which logical or physical adjacency information belongs.

Here, it is assumed that a "list of building names present in master data", a "list of building names that were actually input to the data", "connection information of buildings present in master data", and "connection information of buildings that were actually input to the data" are stored in an internal memory.

Hereinafter, a building name that is present in the master data is called an original name, a building name that was actually input through an operation on an input apparatus is called an abbreviated name, the i-th original name is written as $$r_i (i \in \mathbb{Z})$$

the j-th abbreviated name is written as $$a_j (j \in \mathbb{Z})$$

a set of original names is written as $$Y := \{r_i\}$$

and a set of abbreviated names is written as $$A := \{a_j\}$$

First, the Levenshtein distance calculation unit 11, calculates the Levenshtein distances between the abbreviated name and the original names. The Levenshtein distance calculation unit 11 selects an original name for which the distance is the shortest distance as a candidate. However, if there are multiple original names with the shortest distance, the Levenshtein distance calculation unit 11 selects all of the relevant original names as the above-described candidates. A list of abbreviated name-original name candidates obtained through this processing is called a Leven list indicated in the equation below, and the correspondence relationship between the original name and the abbreviated name is written as "L:A→Y", as a function from A to Y.

$$\text{Leven list} := \{(L(a_i), a_i) \mid L(a_i) \subseteq Y, a_i \in A, i \in \{1, 2, \cdots, \#\{A\}\}\}$$

Also, the TF-IDF calculation unit 12 divides all of the abbreviated names and original names into morphemes, and calculates the importance of each morpheme using the frequency and count of the morpheme, based on the product of TF and IDF.

However, if there is a morpheme having a containment relationship, the TF-IDF calculation unit 12 divides the containing morpheme by the contained morpheme. For example, if "Akita U (Akita University)" and "Akita" are present, "Akita U" is divided into "Akita" and "U (University)".

An example of a containment relationship will be described. When one morpheme is contained in another morpheme, as with "Akita U" and "Akita", "Akita U" is expressed as containing "Akita". However, in a case such as "Akifuyuta" and "Akita", these do not have a containment relationship.

The TF-IDF calculation unit 12 vectorizes the original names and the abbreviated name based on the degrees of importance of the constituent morphemes. The TF-IDF calculation unit 12 calculates the degree of similarity between the vectorized abbreviated name and the vectorized original name using the following equation. However, $$\|\cdot\|_2$$

indicates a Euclidian norm.

$$[\text{degree of similarity of vectors } x, y] = \frac{x^T y}{\|x\|_2 \|y\|_2}$$

$$x, y \in \mathbb{R}^n$$

The TF-IDF calculation unit 12 selects an original name for which the degree of similarity to the abbreviated name is the greatest as the candidate. However, if there are multiple original names that provide the maximum value of the degree of similarity to the abbreviated name, the TF-IDF calculation unit 12 selects all of them as candidates for the original name.

Also, the TF-IDF calculation unit 12 uses "no relevant building name" for an abbreviated name for which the degree of similarity to all original names is 0.

A list of abbreviated name-original name candidates obtained through these processes is called a TF-IDF list shown in the equation below, and this correspondence relationship is written as T:A→Y, as a function from A to Y. However, if there is no relevant building name, $T(a_i)$ is empty.

$$\text{TF-IDF list} := \{(T(a_i), a_i) \mid T(a_i) \subseteq Y, a_i \in A, i \in \{1, 2, \cdots, \#\{A\}\}\}$$

The data input unit 13 receives input of the two lists that are the calculation results obtained by the Levenshtein distance calculation unit 11 and the TF-IDF calculation unit 12, and transfers the two lists to the calculation unit 14.

When these two lists are obtained, the calculation unit 14 uses the lists and the following procedure to perform calculation according to narrowing-down in which connection information is used. FIGS. 2, 3, 4, 5, and 6 are flow charts showing examples of processing procedures performed by the data search apparatus according to an embodiment of the present invention.

Narrowing-down method in which connection information is used (1) (Leven list and connection information)

(Step 1) (S01) In a Leven list, abbreviated names having multiple original name candidates, and abbreviated names in which the names differ between the abbreviated name and the original name, that is, the names are not identical, are called [original name unknown] and are defined using the following equation.

[original name unknown] :=
$$\{a_j \in A \mid a_j \neq a_j^* \text{ or } \#\{L(a_j)\} > 1 \text{ or } \#\{L(a_j)\} = 0\}$$

Also, a combination of an abbreviated name and an original name for which there is one candidate for the original name is called [original-abbreviated correspondence chart], and is defined as follows.

[original-abbreviated correspondence chart] :=
$$\{(r_i, a_j) \in Y \times A \mid L(a_j) = r_i\}$$

Furthermore, a combination of an abbreviated name and an original name for which there are multiple candidates for the original name is called [original-abbreviated correspondence chart (multiple)], and is defined as follows.

[original-abbreviated correspondence chart (multiple)] :=
$$[(L(a_j), a_j) \mid L(a_j) \subseteq Y, a_j \in A, \#\{L(a_j)\} > 1)]$$

(Step 2) The calculation unit 14 starts the processing for all abbreviated names in [original name unknown] and, for a certain abbreviated name $a_j \in$[original name unknown], extracts a building name that is directly connected to that abbreviated name from "connection information of a building that was actually input to data" (S02). This building name is set as a partner abbreviated name for the abbreviated name $a_j$, and is written as "partner abbreviated name]$_j$, which is defined as follows, k of $a_k$ below can take a value from 1 to #{A} (excluding j). #{A} indicates the number of elements in the set A.

$B_r$ := [connection information of
building that was actually input to data] $\in A \times A$

[partner abbreivated name]$_j$ :=
$$\{a_k \in A \mid (a_k, a_j) \in B_r \text{ or } (a_j, a_k) \in B_r, a_j \in \text{original name unknown}\}$$

(Step 3) Among the abbreviated names in [partner abbreviated name]$_j$, the calculation unit 14 returns all of the building names for which the original name has been discovered in [original-abbreviated correspondence chart] to their original names. The calculation unit 14 sets the list of original names as the partner original names for the abbreviated name $a_j$ and sets [partner original name]$_j$ defined as follows (S03). When [partner original name] is empty (S04: No), the processing returns to S01, and when it is not empty (SCA: Yes), the processing moves to step 4 below.

[partner original name]$_j$ :=
$$\{r_i \in Y \mid (r_j, a_j) \in \text{[original-abbreviated correspondence chart]},$$
$$a_i \in \text{[original name unknown]}\}$$

(Step 4) The calculation unit 14 obtains the building names connected to the original names included in the [partner original name]$_j$ from "connection information of buildings present in master data". At this time, the calculation unit 14 makes a list of original names connected to a given building that is present in [partner original name]$_j$. However, when a list is to be made, the calculation unit 14 first gives priority to building information obtained from [partner original name]$_j$ in which the abbreviated name and the original name are identical.

That is, the calculation unit 14 first creates a list of original names that are connected to any of the buildings for which the abbreviated name and the original name are identical (S11), calls the original name a common original name that is held in common with the abbreviated name $a_j$, and sets [common original name]$_j$ defined as follows.

Note that $L^{-1}: Y \to A$ is a function that returns a corresponding abbreviated name in a Leven list for each original name. $r_l$ below indicates an element of [partner original name]$_j$, that is, an original name in a connection relationship with $a_j$. l of $r_l$ can take a value from 1 to #{Y} (excluding j). #{Y} indicates the number of elements in the set Y.

$B_m$ :=
[connection information of buildings present in master data] $\in Y \times Y$

[common original name]$_j$ :=
$$\{r_i \in Y \mid \forall r_l \in \text{[partner original name]}_j \text{ s.t. } L^{-1}(r_l) = r_l,$$
$$(r_i, r_l) \in B_m \text{ or } (r_l, r_i) \in B_m\}$$

Then, the calculation unit 14 obtains a common set of the buildings connected to the remaining original names of [partner original name], and [common original name]$_j$.

A common set is also called an intersection, and indicates a set that includes all members included in common in all groups of provided sets and that does not include other members.

Next, the calculation unit 14 sets this set as an original name candidate for the abbreviated name $a_j$, and sets [original name candidate]$_j$ defined as follows.

In order to create [original name candidate]$_j$, the calculation unit 14 first sets [original name candidate]$_j$=[common original name]$_j$ (S12). Thereafter, the calculation unit 14 starts processing for original names that do not match the abbreviated names among the original names in [partner original name]$_j$, and updates [original name candidate]$_j$ by obtaining a common set between (1) [original name candidate]$_j$, and (2) a set composed of original names connected to original names included in [partner original name]$_j$ as follows (S13).

[original name candidate]$_j$ ← [original name candidate]$_j$ ∩
$$\{r_i \in \mid r_n \in \text{[partner original name]}_j \text{ s.t. } r_n \notin L^{-1}(r_n),$$
$$(r_i, r_n) \in B_m \text{ or } (r_n, r_i) \in B_m\}$$

If the common set becomes empty in this update (S14: No), the calculation unit 14 substitutes [common original name] in [original name candidate]$_j$ (S15), and deletes the original name ($r_n$, $L^{-1}(r_n)$) of [partner original name]$_j$, which caused the common set to become empty, from [partner original name]$_j$ and [original-abbreviated correspondence chart] (S16).

This processing is processing for preventing [original name candidate]$_j$ from becoming empty when a combination in which the correspondence with [partner abbreviated name]$_j$ is erroneous is present in [partner original name]$_j$.

If the common set is not empty in the above-described update (S14: Yes), or after S16, the processing from S13 is repeated until the processing for members of [partner original name]$_j$ in which the original name and the abbreviated name do not match ends.

Here, if [original name candidate]$_j$ is composed of one original name (S17: =1), the calculation unit 14 newly adds the combination of that original name and the abbreviated name to [original-abbreviated correspondence chart] in accordance with the following conditional branches i), ii), and iii) (S21), and after S21, the calculation unit 14 deletes the abbreviated name $a_j$ from the list [original name unknown] (S22).

i) If a combination of $a_j$ and an original name that is not [original name candidate]$_j$ is present in [original-abbreviated correspondence chart] (S18: =1), the calculation unit 14 deletes the (L($a_j$), $a_j$) that is already present as an error (S19-1), and adds a combination of the abbreviated name and the original name selected using the connection information ([original name candidate]$_j$, $a_j$) as a correct answer to [original-abbreviated correspondence chart] (S21).

ii) If a combination of $a_j$ and an original name that is not in [original name candidate]$_j$ is present in [original-abbreviated correspondence chart (multiple)] (S18: >1), the calculation unit 14 deletes the combination that already exists (L($a_j$), $a_j$) as an error (S19-2) and if [original name candidate]$_j$∈$L_j$) is satisfied (S20: Yes), ([original name candidate]$_j$, $a_j$) is added as a correct answer to [original-abbreviated correspondence chart (S21). On the other hand, if $$[\text{original name candidate}]_j \notin L(a_j)$$

is satisfied (S20: No), the calculation unit 14 leaves $a_j$ as having an unknown original name and deletes (L($a_j$), $a_j$) as described above (S19-2), but skips S21 and S22.

iii) if a combination of $a_j$ and [original name candidate]$_j$ exists in neither [original-abbreviated correspondence chart] nor [original-abbreviated correspondence chart (multiple)] (S18: =0), the calculation unit 14 adds $a_j$ and [original name candidate]$_j$ to [original-abbreviated correspondence chart] (S21).

Also, if [original name candidate]$_j$ is multiple candidates (S17: >1) and the relevant abbreviated name is included in [original-abbreviated correspondence chart] (S24: =1), the calculation unit 14 deletes the combination (L($a_j$), $a_j$) in [original-abbreviated correspondence chart] as an error (S23). In addition, the calculation unit 14 sets a sum of sets of [original name candidate]$_j$ and L($a_i$) as a new [original name candidate]$_j$ (S25).

On the other hand, if the relevant abbreviated name is included in [original-abbreviated correspondence chart (multiple)] (S24: >1), the calculation unit 14 deletes (L($a_j$), $a_j$) from [original-abbreviated correspondence chart (multiple)] (S23). Then, the calculation unit 14 sets the common set of [original name candidate] and L($a_i$) as the new [original name candidate]$_j$ (S26).

When [original name candidate]$_j$ is empty (S17: =0), only if L($a_j$) is present (S27: ≥1), the calculation unit 14 deletes the combination (L($a_j$), $a_j$) as an error from [original-abbreviated correspondence chart] or [original-abbreviated correspondence chart (multiple)] (S28).

When S27: ≥1, when S20: No, or after S22, S25, S26, and S28, the processing from S02 is repeated until the processing for all abbreviated names in [original name unknown] is complete. When this processing is complete, the calculation unit 14 repeats steps 3 and 4 until the number of abbreviated names included in "original name unknown" stops changing (S29: No). When the number of abbreviated names stops changing, the processing moves to step 5 below.

(Step 5) Thereafter, the calculation unit 14 uses Levenshtein distances to narrow down [original name candidate] that corresponds to the remaining abbreviated names included in [original name unknown].

The Levenshtein distance calculation unit 11 calculates the Levenshtein distances between $a_j$∈[original name unknown] and the original names in [original name candidate]. Here, the condition "replacement cost: 1000000, additional cost: 1000, deletion cost: 1" is set.

The last three digits of the distance calculated under this condition correspond to the number of deletions needed in order to convert the original names of [original name candidate]$_j$ into abbreviated names $a_j$.

If the number of deletions is greater than or equal to the number of characters of $r_i$ in the original name $r_i$ of [original name candidate]$_j$ (S30: Yes), the narrowing-down unit 15 deletes $r_i$ from [original name candidate]$_j$ assuming that $r_i$ does not have characters in common with abbreviated name $a_j$ (S31).

When the result of S30 is "No" or after S31, the processing of S30 and S31 is repeated until the calculation of the Levenshtein distances between $a_j$∈[original name unknown] and all original names in [original name candidate]$_j$ is complete.

If the number of elements of [original name candidate]$_j$ has reached 1 through the prior processing (S31-2: Yes), the narrowing-down unit 15 adds $a_j$ and [original name candidate]$_j$ to [original-abbreviated correspondence chart]. However, if [original name candidate]$_j$ has become an empty set (S31-2: No), there is a possibility that $a_j$ is an alias, and therefore the narrowing-down unit 15 maintains the [original name candidate]$_j$ prior to performing step 5 (S32). When S31-2: Yes or after S32, the processing of S30 and onward is repeated until the processing for all abbreviated names in [original name unknown] is complete.

Through the above-described operation, the data search apparatus 10 can obtain an original name-abbreviated name correspondence list [original-abbreviated correspondence chart], [original name unknown] in which the original name is riot uniquely determined physically or name-wise, and corresponding candidates [original name candidate], and thus a correspondence chart of master data names and actually-input data names can be output by the data output unit 16.

Narrowing-down method using connection information (2) (TF-IDF list and connection information)

By performing processing similar to that of the above-described steps 1 to 5, the data search apparatus 10 can obtain [original name unknown] and a corresponding [original name candidate] also for a TF-IDF list.

However, the data search apparatus 10 replaces the function L used above with a function T in all steps, and in step 1, lists (1) an abbreviated name with an unknown original name, an abbreviated name having multiple original name candidates, and (3) an abbreviated name in which the names of the abbreviated name and the original name are different (not identical) as [original name unknown]. The other processing is similar to that of steps 1 to 5 regarding a Leven list.

Next, as an operation example using this method, an overview of applied data and a result will be introduced.

Data:

Y={Fukashima, Yamadakominato, Iwaki-Izumi, Iwaki-Misaka, Aizuwakamatsu-Azuma, Fukushima-Soma, Iwaki, Aizuwakamatsu, Sukagawa, Koriyama}

A={Fukushima, Kominato, Izumi, Misaka, Azuma, Soma, Iwaki, Aizuwakamatsu, Dainiyabuki, Koriyama}

Alias notation: present (the building name "Sukagawa" has been input as the alias "Dainiyabuki")

Accurate combinations of original names and abbreviated names:

{((Fukushima, Fukushima), (Yamadakominato, Kominato), (Fukushima-Soma, Soma), (Iwaki, Iwaki), (Koriyama, Koriyama), (Iwaki-Izumi, Izumi), (Aizuwakamatsu, Aizuwakamatsu), (Iwaki-Misaka, Misaka), (Sukagawa, Dainiyabuki), (Aizuwakamatsu-Azuma, Azuma))}

In this manner, the data search apparatus 10 can output a correspondence chart of the master data names and the actual input data names using the data output unit 16.

Next, steps 1 to 5 below will be described as a calculation process used when a Leven list is used.

Step 1

The Levenshtein distance calculation unit 11 uses the Levenshtein distances to select the original names at the shortest distances from the abbreviated names. The Leven list obtained at this time is shown below.

Leven list={((Fukushima, Fukushima), (Yamadakominato, Kominato), (Fukushima-Soma, Soma), (Iwaki, Iwaki), (Aizuwakamatsu, Aizuwakamatsu), (Koriyama, Koriyama), ((Fukushima, Iwaki-Izumi, Koriyama), Izumi), ((Fukushima, Koriyama), Misaka), ((Fukushima, Aizuwakamatsu-Azuma, Koriyama), Azuma), ((Fukushima, Koriyama), Dainiyabuki))}

Accordingly, [original name unknown], [original-abbreviated correspondence chart], and [original-abbreviated correspondence chart (multiple)] are shown below.

[Original name unknown]={Kominato, Izumi, Misaka, Azuma, Soma, Dainiyabuki}

[Original-abbreviated correspondence chart]={((Fukushima, Fukushima), (Yamadakominato, Kominato), (Fukushima-Soma, Soma), (Iwaki, Iwaki), (Aizuwakamatsu, Aizuwakamatsu), (Koriyama, Koriyama))}

[Original-abbreviated correspondence chart (multiple)]={ (((Fukushima, Iwaki-Izumi, Koriyama), Izumi), ((Fukushima, Koriyama), Misaka), ((Fukushima, Aizuwakamatsu-Azuma, Koriyama), Azuma), ((Fukushima, Koriyama), Dainiyabuki))}

Step 2

$B_r$ below can be envisioned as "connection information of buildings that were actually input to data".

$B_r$={((Azuma, Aizuwakamatsu), (Azuma, Iwaki), (Azuma, Fukushima), (Azuma, Izumi), (Kominato, Izumi), (Izumi, Dainiyabuki), (Izumi, Fukushima), (Fukushima, Soma), (Fukushima, Misaka), (Koriyama, Dainiyabuki), (Soma, Misaka))}

The calculation unit 14 extracts the partner abbreviated names as follows by using the connection information $B_r$ for the abbreviated names of [original name unknown].

j=2 (abbreviated name: Kominato) [partner abbreviated name]$_2$={Izumi} j=3 (abbreviated name: Izumi) [partner abbreviated name]$_3$={Azuma, Kominato, Dainiyabuki, Fukushima} j=4 (abbreviated name: Misaka) [partner abbreviated name]$_4$={Fukushima, Soma} j=5 (abbreviated name: Azuma) [partner abbreviated name]$_5$={Aizuwakamatsu, Iwaki, Fukushima, Izumi} j=6 (abbreviated name: Soma) [partner abbreviated name]$_6$={Fukushima, Misaka} j=9 (abbreviated name: Dainiyabuki) [partner abbreviated name]$_9$={Koriyama}

In this manner, the calculation unit 14 can obtain the partner abbreviated names.

Step 3

The calculation unit 14 obtains the partner original names as follows.

j=2 (abbreviated name: Kominato) [partner original name]$_2$={ } j=3 (abbreviated name: Izumi) [partner original name]$_3$={Yamadakominato, Fukushima} j=4 (abbreviated name: Misaka) [partner original name]$_4$={Fukushima, Fukushima-Soma} j=5 (abbreviated name: Azuma) [partner original name]$_5$={Aizuwakamatsu, Iwaki, Fukushima} j=6 (abbreviated name: Soma) [partner original name]$_6$={Fukushima} j=9 (abbreviated name: Dainiyabuki) [partner original name]$_9$={Koriyama}

In this manner, the calculation unit 14 can obtain the partner original names.

Step 4

$B_m$ as shown below can be envisioned as the "connection information of the buildings present in the master data".

$B_m$={((Aizuwakamatsu-Azuma, Aizuwakamatsu), (Aizuwakamatsu-Azuma, Iwaki), (Aizuwakamatsu-Azuma, Fukushima), (Aizawakamatsu-Azuma, Iwaki-Izumi), (Yamadakominato, Iwaki-Izumi), (Iwaki-Izumi, Koriyama), (Iwaki-Izumi, Fukushima), (Fukushima, Fukushima-Soma), (Fukushima, Iwaki-Misaka), (Koriyama, Sukagawa), (Fukushima-Soma, Iwaki-Misaka))}

The calculation unit 14 obtains the common original names using $B_m$.

Processing for when j=2 (abbreviated name: Kominato)

[Partner original name]$_2$ is empty, and therefore the calculation unit 14 leaves the abbreviated name "Kominato" with original name unknown.

Processing for when j=3 (abbreviated name: Izumi)

The only abbreviated name in which the elements of [partner original name]$_3$ are identical and the original name and abbreviated name are identical is "Fukushima". Accordingly, [common original name]$_3$ is indicated below.

[Common original name]$_3${Aizuwakamatsu-Azuma, Iwaki-Izumi, Fukushima-Soma, Iwaki-Misaka}

"Fukushima" and "Yamadakominato" are the elements of [partner original name]$_3$. The only original name in a connection relationship with "Yamadakominato" in $B_m$ is "Iwaki-Izumi". Accordingly, [original name candidate]$_3$={Iwaki-Izumi}. Accordingly, ((Fukushima, Iwaki-Izumi, Koriyama), Izumi) and "Iwaki-Izumi" are included in [original-abbreviated correspondence chart (multiple)]. Due to the above, the calculation unit 14 deletes ((Fukushima, Iwaki-Izumi, Koriyama), Izumi) from [original-abbreviated correspondence chart (multiple)] and adds (Iwaki-Izumi, Izumi), which is a new combination, to [original-abbreviated correspondence chart].

Processing for when j=4 (abbreviated name: Misaka)

Similarly, [common original name]$_4$ is constituted as follows by the original names that are in a connection relationship with "Fukushima" in $B_m$.

[Common original name]$_4$={Aizuwakamatsu-Azuma, Iwaki-Izumi, Iwaki-Misaka, Fukushima-Soma}

"Fukushima-Soma" is also included in the elements of [partner original name]$_4$. The calculation unit 14 obtains a common set of [common original name]$_4$ and building names that have a connection relationship with the building. [Original name candidate]$_4$ is constituted as follows.

[Original name candidate]$_4$={Iwaki-Misaka}

Here, due to the fact that ((Fukushima, Koriyama), Misaka) is present in [original-abbreviated correspondence chart (multiple)] and Iwaki-Misaka is not an element of L(a$_4$), the calculation unit 14 erases ((Fukushima, Koriyama), Misaka) as an error from [original-abbreviated correspondence chart (multiple)], and does not add anything to [original-abbreviated correspondence chart].

Processing for when j=5 (abbreviated name: Azuma)

[Partner original name]$_5$ is constituted by elements that all have identical original names and abbreviated names. Accordingly, [common original name]$_5$ and [original name candidate]$_5$ is constituted as follows by an original name that has a connection relationship also with all of "Aizuwakamatsu", "Iwaki", and "Fukushima" in B$_m$.

[Original name candidate]$_5$=[=common original name]$_5$={Aizuwakamatsu-Azuma}

Accordingly, the calculation unit 14 deletes ((Fukushima, Aizuwakamatsu-Azuma, Koriyama), Azuma) from [original-abbreviated correspondence chart (multiple)] and adds (Aizuwakamatsu-Azuma, Azuma), which is a new combination, to [original-abbreviated correspondence chart].

Processing for when j=6 (abbreviated name: Soma)

[Common original name]$_6$ is constituted as follows by original names having a connection relationship with "Fukushima" in B$_m$.

[Common original name]$_6$={Aizuwakamatsu-Azuma, Iwaki-Izumi, Fukushima-Soma, Iwaki-Misaka}

The only original name for which the original name and the abbreviated name are the same in [partner original name]$_6$ is "Fukushima", and therefore [original name candidate]$_6$=[common original name]$_6$ is satisfied. Here, the calculation unit 14 deletes (Fukushima-Soma, Soma) from [original-abbreviated correspondence chart].

Processing for when j=9 (abbreviated name: Dainiyabuki)

The only original name in which the element of [partner original name]$_9$ is identical and the original name and abbreviated name are identical is "Koriyama". Accordingly, [common original name], is composed of the original name "Sukagawa", which is in a connection relationship with "Koriyama" in B$_m$, as shown below.

[Original name candidate]$_9$=[common original name]$_9$={Sukagawa}

Regarding the abbreviated name "Dainiyabuki", ((Fukushima, Koriyama), Dainiyabuki) is present in [original-abbreviated correspondence chart (multiple), and "Sukagawa" is not included in [original-abbreviated correspondence chart (multiple)]. Accordingly, the calculation unit 14 deletes ((Fukushima, Koriyama), Dainiyabuki) from [originate abbreviated correspondence chart (multiple)].

At this point in time, [original name unknown], [original-abbreviated correspondence chart], and [original-abbreviated correspondence chart (multiple)] are shown below.

[Original name unknown]={Kominato, Misaka, Soma, Dainiyabuki}

[Original-abbreviated correspondence chart]={((Fukushima, Fukushima), (Yamadakominato, Kominato), (Iwaki, Iwaki), (Aizuwakamatsu, Aizuwakamatsu), (Koriyama, Koriyama), (Iwaki-Izumi, Izumi), (Aizuwakamatsu-Azuma, Azuma))}

[Original-abbreviated correspondence chart (multiple)]={ }

The calculation unit 14 once again performs operations corresponding to steps 3 and 4 as follows on the remaining abbreviated names with unknown original names.

Step 3 (Second Time)

The calculation unit 14 obtains the partner original names as follows.

j=2 (abbreviated name: Kominato) [partner original name]$_2$={Iwaki-Izumi} j=4 (abbreviated name: Misaka) [partner original name]$_4$={Fukushima} j=6 (abbreviated name: Soma) [partner original name]$_6$={Fukushima} j=9 (abbreviated name: Dainiyabuki) [partner original name]$_9$={Koriyama}

Step 4 (Second Time)

Processing for when j=2 (abbreviated name: Kominato)

Since there is no original name for which the original name and the abbreviated name are identical in [partner original name]$_2$, original names that have a connection relationship with "Iwaki-Izumi" correspond as [original name candidate]$_2$. That is, [original name candidate]$_2$ is shown below.

[Original name candidate]$_2$={Aizuwakamatsu-Azuma, Yamadakominato, Sukagawa, Fukushima}

Here, since the combination (Yamadakominato, Kominato) is present in [original-abbreviated correspondence chart] and there are multiple elements in [common original name]$_2$, the calculation unit 14 deletes (Yamadakominato, Kominato) from [original-abbreviated correspondence chart].

Processing for when j=4 (abbreviated name: Misaka)

Since "Fukushima-Soma" in [partner original name]$_4$ was deleted from [original-abbreviated correspondence chart], [original name candidate]$_4$ is shown below.

[Original name candidate]$_4$={Aizuwakamatsu-Azuma, Iwaki-Izumi, Fukushima-Soma, Iwaki-Misaka}

Processing for when j=6 (abbreviated name: Soma)

Since there is no change in step 3 (second time) in [common original name]$_6$, as described below, [common original name]$_6$ is constituted as follows by original names that are in a connection relationship with "Fukushima" in B$_m$.

[Common original name]$_6$ {Aizuwakamatsu-Azuma, Iwaki-Izumi, Fukushima-Soma, Iwaki-Misaka}

Processing for when j=9 (abbreviated name: Dainiyabuki)

Since there is no change in step 3 (second time) in [partner original name], as well, the only original name in which the original name and the abbreviated name are the same is "Koriyama". Accordingly, [original name candidate]$_9$, is shown below.

[Original name candidate]$_9$=[common original name]$_9$={Sukagawa}

Since there is a combination of the abbreviated name "Dainiyabuki" and a corresponding original name in neither [original-abbreviated correspondence chart] nor [original-abbreviated correspondence chart (multiple)], the calculation unit 14 adds (Sukagawa, Dainiyabuki), which is a new combination, to [original-abbreviated correspondence chart], At this point in time, [original name unknown], [original-abbreviated correspondence chart], and [original-abbreviated correspondence chart (multiple)] are shown below.

[Original name unknown]={Kominato, Misaka, Soma}

[Original-abbreviated correspondence chart]={((Fukushima, Fukushima), (Iwaki, Iwaki), Aizuwakamatsu, Aizuwakamatsu), (Koriyama, Koriyama), (Iwaki-Izumi, Izumi), (Aizuwakamatsu-Azuma, Azuma), (Sukagawa, Dainiyabuki))}

[Original-abbreviated correspondence chart (multiple)]={ }

The candidates for the corresponding original names are [original name candidate]$_2$, [original name candidate]$_4$, and [original name candidate]$_6$ below.

[Original name candidate]$_2$={Aizuwakamatsu-Azuma, Yamadakominato, Sukagawa, Fukushima}

[Original name candidate]$_4$={Aizuwakamatsu-Azuma, Iwaki-Izumi, Fukushima-Soma, Iwaki-Misaka}

[Original name candidate]$_6$={Aizuwakamatsu-Azuma, Iwaki-Izumi, Fukushima-Soma, Iwaki-Misaka}

Since there will be no change in the number of abbreviated names with unknown original names even if operation is further performed, the processing advances to the next step 5.

Step 5

The Levenshtein distance calculation unit 11 calculates the Levenshtein distances between the abbreviated names $a_1$ and the original names of [original name candidate]$_1$ for j=2, 4, and 6.

Processing for when j=2 (abbreviated name: Kominato)

The distances from the original names calculated when j=2 are shown below.

Aizuwakamatsu-Azuma: 2006, Sukagawa: 2003, Fukushima: 2002, Yamadakominato: 2

Among these original names, the only original name for which the value of the final digit of the distance is smaller than the number of characters of that original name is "Yamadakominato". Accordingly, the narrowing-down unit 15 adds (Yamadakominato, Kominato), which is a new combination, to [original-abbreviated correspondence chart].

Processing for when j=4 (abbreviated name: Misaka)

The distances from the original names calculated when j=4 are shown below.

Aizuwakamatsu-Azuma: 2006, Iwaki-Izumi: 2004, Fukushima-Soma: 2004, Iwaki-Misaka: 1004

Among these original names, the only original name for which the value of the final digit of the distance is smaller than the number of characters of that original name is "Iwaki-Misaka". Accordingly, the narrowing-down unit 15 adds (Iwaki-Misaka, Misaka), which is a new combination, to [original-abbreviated correspondence chart].

Processing for when 1-6 (abbreviated name: Soma)

The distances from the original names calculated when j=6 are shown below.

Aizuwakamatsu-Azuma: 2006, Iwaki-Izumi: 2004, Fukushima-Soma: 2, Iwaki-Misaka: 2005

Among these original names, the only original name for which the value of the final digit of the distance is smaller than the number of characters of that original name is "Fukushima-Soma". Accordingly, the narrowing-down unit 15 adds (Fukushima-Soma, Soma), which is a new combination, to [original-abbreviated correspondence chart].

According to the above, since there are no more abbreviated names for which the original name has not been discovered, the operation for narrowing down ends. The obtained combinations of original names and abbreviated names are shown below.

[Original-abbreviated correspondence chart]={((Fukushima, Fukushima), (Yamadakominato, Kominato), (Fukushima-Soma, Soma), (Iwaki, Iwaki), (Koriyama, Koriyama), (Iwaki-Izumi, Izumi), (Aizuwakamatsu, Aizuwakamatsu), (Iwaki-Misaka, Misaka), (Sukagawa, Dainiyabuki), (Aizuwakamatsu-Azuma, Azuma))}

With this combination, the original names for all abbreviated names are specified.

Calculation using TF-IDF list

Step 1

If TF-IDF is used, there is no change in the results for [original name unknown] compared to when a Leven list is used, but [original-abbreviated correspondence chart] will indicate a result that is different from that obtained when a Leven list is used. First, a TF-IDF list will be shown below.

TF-IDF list={((Fukushima, Fukushima, (Yamadakominato, Kominato), (Fukushima-Soma, Soma), (Iwaki, Iwaki), (Koriyama, Koriyama), (Iwaki-Izumi, Izumi), (Aizuwakamatsu, Aizuwakamatsu), (Aizuwakamatsu-Azuma, Azuma))}

Accordingly, [original name unknown] and [original-abbreviated correspondence chart] are obtained as shown below.

[Original name unknown]={Kominato, Izumi, Misaka, Azuma, Soma, Dainiyabuki}

[Original-abbreviated correspondence chart]={((Fukushima, Fukushima), (Yamadakominato, Kominato), (Fukushima-Soma, Soma), (Iwaki-Izumi, Izumi), (Iwaki, Iwaki), (Aizuwakamatsu-Azuma, Aroma), (Fukushima-Soma, Soma), (Aizuwakamatsu, Aizuwakamatsu), (Koriyama, Koriyama))}

However, since there is no relevant original name for the abbreviated names "Misaka" and "Dainiyabuki", [original-abbreviated correspondence chart (multiple)] is empty.

Step 2

The calculation unit 14 extracts the partner abbreviated names as follows using the connection information $B_r$ for the abbreviated names with unknown original names.

j=2 (abbreviated name: Kominato) [partner abbreviated name]$_2$-{Izumi} j=3 (abbreviated name: Izumi) [partner abbreviated name]={Azuma, Kominato, Dainiyabuki, Fukushima} j=4 (abbreviated name: Misaka) [partner abbreviated name]$_4$={Fukushima, Soma} j=5 (abbreviated name: Azuma) [partner abbreviated name]$_5$={Aizuwakamatsu, Iwaki, Fukushima, Izumi}

J=6 (abbreviated name: Soma) [partner abbreviated name]$_6$-{Fukushima, Misaka} j=9 (abbreviated name: Dainiyabuki) [partner abbreviated name]={Koriyama}

In this manner, the calculation unit 14 can obtain the partner abbreviated names.

Step 3

The calculation unit 14 obtains the partner original names as follows using [original-abbreviated correspondence chart].

j=2 (abbreviated name: Kominato) [partner original name]$_2$={Iwaki-Izumi} j=3 (abbreviated name: Izumi) [partner original name]$_3$-{Aizuwakamatsu-Azuma, Yamadakominato, Fukushima} j=4 (abbreviated name: Misaka) [partner original name]$_4$={Fukushima, Fukushima-Soma} j=5 (abbreviated name: Azuma) [partner original name]$_5$={Aizuwakamatsu, Iwaki, Fukushima, Iwaki-Izumi} j=6 (abbreviated name: Soma) [partner original name]$_6$={Fukushima} j=9 (abbreviated name: Dainiyabuki) [partner original name]$_9$={Koriyama}

In this manner, the calculation unit 14 can obtain the partner original names.

Step 4

The calculation unit 14 obtains the common original names using $B_m$ below.

$B_m$={((Aizuwakamatsu-Azuma, Aizuwakamatsu), (Aizuwakamatsu-Azuma, Iwaki), (Aizuwakamatsu-Azuma, Fukushima), (Aizuwakamatsu-Azuma, Iwaki-Izumi), (Yamadakominato, Iwaki-Izumi), (Iwaki-Izumi, Koriyama), (Iwaki-Izumi, Fukushima), (Fukushima, Fukushima-Soma), (Fukushima, Iwaki-Misaka), (Koriyama, Sukagawa), (Fukushima-Soma, Iwaki-Misaka))}

Processing for when j=2 (abbreviated name: Kominato)

Since there is no original name for which the original name and the abbreviated name are identical in [partner original name]$_2$, the original names having a connection relationship with "Iwaki-Izumi" correspond to [original name candidate]$_2$. That is, [original name candidate]$_2$ is shown below.

[Original name candidate]$_2$={Aizuwakamatsu-Azuma, Yamadakominato, Sukagawa, Fukushima}

Here, since the combination (Yamadakominato, Kominato) is present in [original-abbreviated correspondence chart] and there are multiple elements in [common original name]$_3$, the calculation unit 14 deletes (Yamadakominato, Kominato) from [original-abbreviated correspondence chart].

Processing for when j=3 (abbreviated name: Izumi)

The only original name in which the element of [partner original name]$_3$ is identical and the original name and abbreviated name are identical is "Fukushima". Accordingly, [common original name] is shown below.

[Common original name]$_3$={Aizuwakamatsu-Azuma, Iwaki-Izumi, Fukushima-Soma, Iwaki-Misaka}

Other elements of [partner original name], include "Aizuwakamatsu-Azuma" and "Yamadakominato". According to $B_m$, the only original name that is in a connection relationship with these two buildings is "Iwaki-Izumi". Accordingly, [original name candidate]$_3$ is shown below.

[Original name candidate]$_3$={Iwaki-Izumi}. This matches (Iwaki-Izumi, Izumi), which is a combination that is already present in [original-abbreviated correspondence chart].

Processing for when j=4 (abbreviated name: Misaka)

Similarly, [common original name]$_4$ is constituted as follows by the original names that are in a connection relationship with "Fukushima" in Bm.

[Common original name]$_4$={Aizuwakamatsu-Azuma, Iwaki-Izumi, Iwaki-Misaka, Fukushima-Soma}

"Fukushima-Soma" is also included in the elements of [partner original name]$_4$. The calculation unit 14 obtains the common set between [common original name] and building names having a connection relationship with the building, and thus obtains [original name candidate]$_4$ below.

[Original name candidate]$_4$={Iwaki-Misaka}

Accordingly, the calculation unit 14 adds (Iwaki-Misaka, Misaka), which is a new combination, to [original-abbreviated correspondence chart].

Processing for when j=5 (abbreviated name: Azuma)

Since [partner original name]$_5$ is constituted by original names for which all original names and abbreviation names are identical, [common original name]$_5$ and [original name candidate]$_5$ are constituted by original names that have a connection relationship with "Aizuwakamatsu", "Iwaki", and "Fukushima" in $B_m$. That is, [original name candidate]$_5$ is shown below.

[Original name candidate]$_5$=[common original name]$_5$={Aizuwakamatsu-Azuma}, and this matches (Aizuwakamatsu-Azuma, Azuma), which is a combination that already exists in [original-abbreviated correspondence chart].

Processing for when J=6 (abbreviated name: Soma)

[Common original name]$_6$ is constituted as follows by original names having a connection relationship with "Fukushima" in $B_m$.

[Common original name]$_6$={Aizuwakamatsu-Azuma, Iwaki-Izumi, Fukushima-Soma, Iwaki-Misaka}

The only original name for which the original name and the abbreviated name are the same in [partner original name]$_6$ is "Fukushima", and therefore [original name candidate]$_6$=[=common original name]$_6$ is satisfied. Here, since the combination (Fukushima-Soma, Soma) is present in [original-abbreviated correspondence chart] and there are multiple elements in [common original name]$_6$, the calculation unit 14 deletes (Fukushima-Soma, Soma) from [original-abbreviated correspondence chart].

Processing for when J=9 (abbreviated name: Dainiyabuki)

The only original name in which the element of [partner original name]$_9$ is identical and the original name and abbreviated name are identical is "Koriyama". Accordingly, as shown below, [common original name]$_9$ is composed of the original name "Sukagawa", which has a connection relationship with "Koriyama" in $B_m$.

[Original name candidate]$_9$=[common original name]$_9$={Sukagawa}

Accordingly, the calculation unit 14 adds (Dainiyabuki, Sukagawa), which is a new combination, to [original-abbreviated correspondence chart].

At this time, [original-abbreviated correspondence chart], [original-abbreviated correspondence chart (multiple)], and [original name unknown] are indicated as shown below.

[Original-abbreviated correspondence chart]={((Fukushima, Fukushima), (Iwaki-Izumi, Izumi), (Iwaki, Iwaki), (Aizuwakamatsu-Azuma, Azuma), (Iwaki-Misaka, Misaka), (Aizuwakamatsu, Aizuwakamatsu), (Koriyama, Koriyama), (Dainiyabuki, Sukagawa))}

[Original-abbreviated correspondence chart (multiple)]={ }

[Original name unknown]={Kominato, Soma}

The calculation unit 14 once again performs steps 3 and 4 as follows on the two building names that are abbreviated names with unknown original names.

Step 3 (Second Time)

The calculation unit 14 obtains the partner original names as follows using [original-abbreviated correspondence chart].

j=2 (abbreviated name: Kominato) [partner original name]$_2$={Iwaki-Izumi} j=6 (abbreviated name: Soma) [partner original name]$_6$={Fukushima, Iwaki-Misaka}

Step 4 (Second Time)

Processing for when j=2 (abbreviated name: Kominato)

Here, since there is no original name for which the original name and the abbreviated name are identical in [partner original name]$_2$, [original name candidate]$_2$ corresponds to original names having a connection relationship with "Iwaki-Izumi". That is, [original name candidate]$_2$ is shown below.

[Original name candidate]$_2$={Aizuwakamatsu-Azuma, Yamadakominato, Sukagawa, Fukushima}

Processing for when J=6 (abbreviated name: Soma)

[Common original name]$_6$ is constituted as follows by original names having a connection relationship with "Fukushima" in $B_m$.

[Common original name]$_6$={Aizuwakamatsu-Azuma, Iwaki-Izumi, Fukushima-Soma, Iwaki-Misaka}

"Iwaki-Misaka" is further included in the elements of [partner original name]$_6$. The calculation unit 14 obtains the common set between [common original name]$_6$ and building names having a connection relationship with the building, and thus obtains [original name candidate]$_6$ below.

[Original name candidate]$_6$={Fukushima-Soma}

Accordingly, the calculation unit 14 adds (Fukushima-Soma, Soma) to [original-abbreviated correspondence chart].

At this time, [original-abbreviated correspondence chart], [original-abbreviated correspondence chart (multiple)], and [original name unknown] are indicated as shown below.

[Original-abbreviated correspondence chart]={((Fukushima, Fukushima), (Iwaki-Izumi, Izumi), (Iwaki, Iwaki), (Aizuwakamatsu-Azuma, Azuma), (Iwaki-Misaka, Misaka), (Aizuwakamatsu, Aizuwakamatsu), (Koriyama, Koriyama), (Dainiyabuki, Sukagawa), (Fukushima-Soma, Soma))}

[Original-abbreviated correspondence chart (multiple)]={ }

[Original name unknown]={Kominato}

Here, [original name candidate]$_2$, which are candidates for corresponding original names, is shown below.

[Original name candidate]$_2$={Aizuwakamatsu-Azuma, Yamadakominato, Sukagawa, Fukushima}

Since there will be no change in the number of abbreviated names with unknown original names even if operation is further performed, the processing advances to the following step 5.

Step 5

The Levenshtein distance calculation unit 11 calculates the Levenshtein distances between the abbreviated name "Kominato" and the original names of [original name candidate]$_2$.

Processing for when j=2 (abbreviated name: Kominato)

The distances from the original names calculated at this time are shown below.

Aizuwakamatsu-Azuma: 2006, Sukagawa: 2003, Fukushima: 2002, Yamadakominato: 2

Accordingly, the original name to which the smallest distance is applied is "Yamadakominato". Accordingly, the narrowing-down unit 15 adds (Yamadakominato, Kominato) to [original-abbreviated correspondence chart].

According to the above, there are no more abbreviated names for which the original name has been discovered, and therefore the operation is ended. [Original-abbreviated correspondence chart], which is the obtained combination of original names and abbreviated names is shown below.

[Original-abbreviated correspondence chart]={((Fukushima, Fukushima), (Yamadakominato, Kominato), (Fukushima-Soma, Soma), (Iwaki, Iwaki), (Koriyama, Koriyama), (Iwaki-Izumi, Izumi), (Aizuwakamatsu, Aizuwakamatsu), (Iwaki-Misaka, Misaka), (Sukagawa, Dainiyabuki), (Aizuwakamatsu-Azuma, Azuma))}

With this [original-abbreviated correspondence chart], all abbreviated names are specified.

According to the above, specification of all buildings was successful even if Leven and TF-IDF lists were used. On the other hand, if an original name is specified using only Levenshtein distances or TF-IDF without using connection information, the number of abbreviated names for which original names are accurately specified are shown below.

Levenshtein Distances 6 out of 10 buildings (Fukushima, Kominato, Soma, Iwaki, Aizuwakamatsu, Koriyama)

TF-IDF 8 out of 10 buildings (Fukushima, Kominato, Izumi, Azuma, Soma, Iwaki, Aizuwakamatsu, Koriyama)

In every method, it was difficult to associate accurate original names with abbreviated names that had a significant distance from the original name, such as "Misaka" and "Dainiyabuki".

Figure 7:
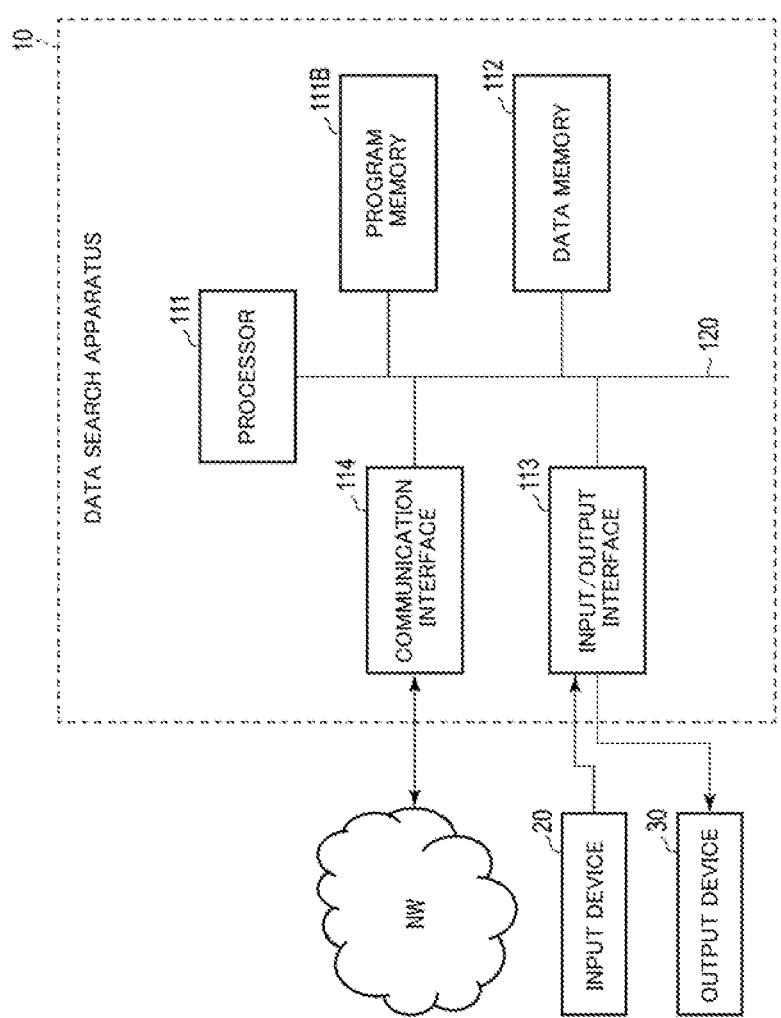
FIG. 7 is a block diagram showing an example of a hardware configuration of a data search apparatus according to an embodiment of the present invention.

FIG. 7 is a block diagram showing an example of a hardware configuration of a data search apparatus according to an embodiment of the present invention.

In the example shown in FIG. 7, the data search apparatus 10 according to the above-described embodiment is constituted by, for example, a server computer or a personal computer, and includes a hardware processor 111A such as a CPU. Also, a program memory 111B, a data memory 112, an input/output interface 113, and a communication interface 114 are connected to the hardware processor 111A via a bus 120.

For example, the communication interface 114 includes one or more wireless communication interface units and enables transmission and reception of information to and from a communication network NW. For example, an interface in which a small-power wireless data communication standard is employed, such as a wireless LAN (Local Area Network), is used as the wireless interface.

An input device 20 and an output device 30 for an operator, which are attached to the data search apparatus 10, are connected to the input/output interface 113.

The input/output interface 113 takes in operation data input by the operator through the input device 20, such as a keyboard, a touch panel, a touchpad, or a mouse, and performs processing for performing display by outputting output data to an output device 30 including a display device in which liquid crystal, organic EL (Electro Luminescence), or the like is used. Note that devices built into the data search apparatus 10 may also be used as the input device 20 and the output device 30, and an input device and an output device of another information terminal that can communicate with the data search apparatus 10 via the network NW may also be used.

For example, in the program memory 111B, a non-temporary physical storage medium in which a non-volatile memory in which writing and readout can be performed at any time, such as an HDD (Hard Disk Drive) or an SSD (Solid State Drive), and a non-volatile memory such as a ROM are used in combination with each other as a non-temporary physical storage medium, and programs needed to execute various types of control processing according to an embodiment are stored therein.

For example, in the data memory 112, the above-described non-volatile memory and a volatile memory such as a RAM are used in combination as a physical storage medium, and the data memory 112 is used to store various types of data acquired and created in the process of performing various types of processing.

The data search apparatus 10 according to an embodiment of the present invention can be constituted as a data processing apparatus that includes the Levenshtein distance calculation unit 11, the TF-IDF calculation unit 12, the data input unit 13, the calculation unit 14, the narrowing-down unit 15, and the data output unit 16 shown in FIG. 1 as processing functional units realized by software.

The data storage region and the data processing region in the data processing apparatus are constituted by using the data memory 112 shown in FIG. 7. However, these regions are not regions that are essential in the data search apparatus 10, and for example, they may also be regions provided in an external storage medium such as a USB (Universal Serial Bus) memory, or in a storage apparatus such as a database server arranged in a cloud.

The processing functional units of the above-described Levenshtein distance calculation unit 11, the TF-IDF calculation unit 12, the data input unit 13, the calculation unit 14, the narrowing-down unit 15, and the data output unit 16 can all be realized by using the above-described hardware processor 111A to read out and execute the programs stored in the program memory 111B. Note that some or all of the processing functional units may also be realized using various other formats, including integrated circuits such as an ASIC (Application Specific Integrated Circuit or an FPGA (Field-Programmable Gate Array).

Also, the method described in the embodiments can also be stored as a program (software means) that can be executed by a computer in a storage medium such as a magnetic disk (Floppy (registered trademark) disk), hard disk, etc.), an optical disk (CD-ROM, DVD, MO, etc.), a semiconductor memory (ROM, RAM, Flash memory, etc.), and can be distributed through transmission using a communication medium. Note that the programs stored in the medium also include setting programs for forming software means (includes not only execution programs but also tables and data structures) to be executed by a computer in the computer. The computer realizing the present invention loads the programs recorded in a recording medium, constructs a software means using a setting program depending on the case, and executes the above-described processing due to operation being controlled using this software means. Note that the recording medium in the present specification is not limited co being for distribution, and includes recording mediums such as a magnetic disk or a semiconductor memory provided inside of a computer or provided in a device connected via a network.

Note that the present invention is not limited to the above-described embodiment and can be modified in various ways without departing from the gist of the invention in the implementation stage. Also, the embodiments may also be implemented in combination with each other as appropriate within reason, and in such a case, combined effects are obtained. Furthermore, various aspects of the invention are included in the above-described embodiment, and various aspects of the invention can be extracted according to the combination selected from the disclosed multiple constituent elements.

REFERENCE SIGNS LIST

10 Data search apparatus
11 Levenshtein distance calculation unit
12 TF-IDF calculation unit
13 Data input unit
14 Calculation unit
15 Narrowing-down unit
16 Data output unit

The invention claimed is:

1. A data search apparatus comprising: an input unit; a storage apparatus configured to store master data names to be managed in association with master data; a processor; and a storage medium having computer program instructions stored thereon, when executed by the processor, perform to:

calculate edit distances between the master data names stored in the storage apparatus and input data names input in the input unit calculate degrees of similarity between the master data names and the input data names based on term frequency and inverse document frequency of the master data names and the input data names; and perform processing for narrowing down candidates for a data name being searched for in the master data names based on the calculation results obtained by the first and second calculation processing units, and adjacency information indicating adjacency relationships between the master data names and the input data names, output information indicating correspondence between the master data names and the input data names based on a candidate for the data name being searched for, the candidate being obtained through the narrowing-down processing.

2. The data search apparatus according to claim 1, wherein in the narrowing-down processing, the computer program instructions further perform to selects, among the master data names stored in the storage apparatus, the master data name with the smallest edit distance calculated by the first calculation processing unit from the input data name as a candidate for a master data name being searched for, and creates a first list indicating a set composed of the selected master data name and the input data name associated with the selection of the master data name; creates a second list indicating, among the input data names in the first list, an input data name associated with a plurality of candidates, and an input data name associated with a master data name that does not have the same notation thereas, creates a third list, which is a list indicating a set composed of one master data name and one input data name of the first list, creates a fourth list, which is a list indicating a set composed of a plurality of master data names and one input data name in the first list, for each input data name in the second list, extracts an input data name having an adjacency relationship with the input data name from adjacency information indicating adjacency relationships between a plurality of the input data names, extracts a first master data name, which is a master data name having a correspondence relationship with the extracted input data name, from the master data names in the third list, for each input data name in the second list, extracts a second master data name, which is the extracted first master data name that is associated with an input data name that has the same notation thereas in the third list, from adjacency information indicating adjacency relationships between a plurality of the master data names stored in the storage apparatus, for each input data name in the second list, extracts a third master data name, which is the extracted first master data name that is associated with an input data name that does not have the same notation thereas in the third list, from the adjacency information indicating adjacency relationships between a plurality of the master data names stored in the storage apparatus, for each input data name in the second list, creates a data name obtained according to a common set of the extracted second and third master data names as a candidate for the master data name corresponding to the input data name indicated by the second list, and performs processing for updating the second, third, and fourth lists according to the creation of the candidate for the master data name, performs processing for calculating, for each input data name in the second list, an edit distance between the input data name and the extracted candidate for the master data name, and in the narrowing-down processing, when the relationship between the calculated edit distance and the number of characters of the candidate for the master data satisfies a condition, performs processing for deleting a candidate that has no character in common with the input data name among the candidates for the master data name, and adding the deleted master data name and the input data used in the calculation of the edit distance for the deleted master data name to the third list.

3. The data search apparatus according to claim 1, wherein in the narrowing-down processing, the computer program instructions further perform to selects, among the master data names stored in the storage apparatus, a master data name with the greatest degree of similarity calculated by the second calculation processing unit to the input data name as a candidate for a master data name being searched for, and creates a first list indicating a set composed of the selected master data name and the input data name associated with the selection of the master data name, creates a second list indicating, among the input data names in the first list, an input data name associated with a plurality of candidates and an input data name associated with a master data name that does not have the same notation thereas, creates a third list, which is a list indicating a set composed of one master data name and one input data name of the first list, creates a fourth list, which is a list indicating a set composed of a plurality of master data names and one input data name in the first list, for each input data name in the second list, extracts an input data name having an adjacency relationship with the input data name from adjacency information indicating adjacency relationships between a plurality of the input data names, extracts a first master data name, which is a master data name having a correspondence relationship with the extracted input data name, from the master data names in the third list, for each input data name in the second list, extracts a second master data name, which is the extracted first master data name that is associated with an input data name that has the same notation thereas in the third list, from adjacency information indicating adjacency relationships between a plurality of the master data names stored in the storage apparatus, for each input data name in the second list, extracts a third master data name, which is the extracted first master data name that is associated with an input data name that does not have the same notation thereas in the third list, from the adjacency information indicating an adjacency relationship between a plurality of the master data names stored in the storage apparatus, for each input data name in the second list, creates a data name obtained according to a common set of the extracted second and third master data names as a candidate for the master data name corresponding to the input data name indicated by the second list, and performs processing for updating the second, third, and fourth lists according to the creation of the candidate for the master data name, performs processing for calculating, for each input data name in the second list, an edit distance between the input data name and the extracted candidate for the master data name, and in the narrowing-down processing, when the relationship between the calculated edit distance and the number of characters of the candidate for the master data satisfies a condition, performs processing for deleting a candidate that has no character in common with the input data name among the candidates for the master data name, and adding the deleted master data name and the input data used in the calculation of the edit distance for the deleted master data name to the third list.

4. A data search method performed by a data search apparatus including an input unit and a storage apparatus storing master data names to be managed in association with master data, the data search method comprising: calculating edit distances between the master data names stored in the storage apparatus and input data names input using the input unit; calculating degrees of similarity between the master data names and the input data names based on term frequency and inverse document frequency of the master data names and the input data names; performing processing for narrowing down candidates for a data name being searched for in the master data names based on the results of calculating the edit distances and the degrees of similarity, and adjacency information indicating adjacency relationships between the master data names and the input data names; and outputting information indicating correspondence between the master data names and the input data names based on a candidate for a data name being searched for, the candidate being obtained through the narrowing-down processing.

5. A non-transitory computer-readable medium having computer-executable instructions that, upon execution of the instructions by a processor of a computer, cause the computer to function as the data search apparatus according to claim 1.

* * * * *